C. YOST.
ANIMAL TRAP.
APPLICATION FILED FEB. 15, 1913.

1,086,259.

Patented Feb. 3, 1914.

Witnesses

W. S. M. Lowell

Inventor
Casper Yost.
By Victor J. Evans
Attorney

UNITED STATES PATENT OFFICE.

CASPER Y0... F... ...VI...LE, ILLINOIS.

A...L-...AP.

1,086,259.  Specification of Letters Patent.  Patented Feb. 3, 1914.

Application filed February 15, 1913. Serial No. 748,631.

*To all whom it may concern:*

Be it known that I, CASPER YOST, a citizen of the United States, residing at Danville, in the county of Vermilion and State of Illinois, have invented new and useful Improvements in Animal-Traps, of which the following is a specification.

This invention relates to animal traps, and it has for its object to produce a self-setting or ever-set trap of simple and improved construction.

A further object of the invention is to provide a simple and improved trap construction which is applicable to traps of all sizes, shapes and dimensions for the purpose of entrapping pest animals of all kinds.

A further object of the invention is to ovide a construction, the principle of ich is equally applicable to a trap in which the receptacle is composed of a box, barrel or the like, or one in which the receptacle is formed by a pit or excavation in the ground.

A further object of the invention is to produce a trap consisting essentially of a cover member, a bait pan connected therewith and trap doors also associated therewith in suitable relation with the other parts.

A further object of the invention is to produce a trap of extremely simple and efficient construction which while always set and ready for the admission of the victim will effectually preclude his escape after being once entrapped.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

Figure 1:
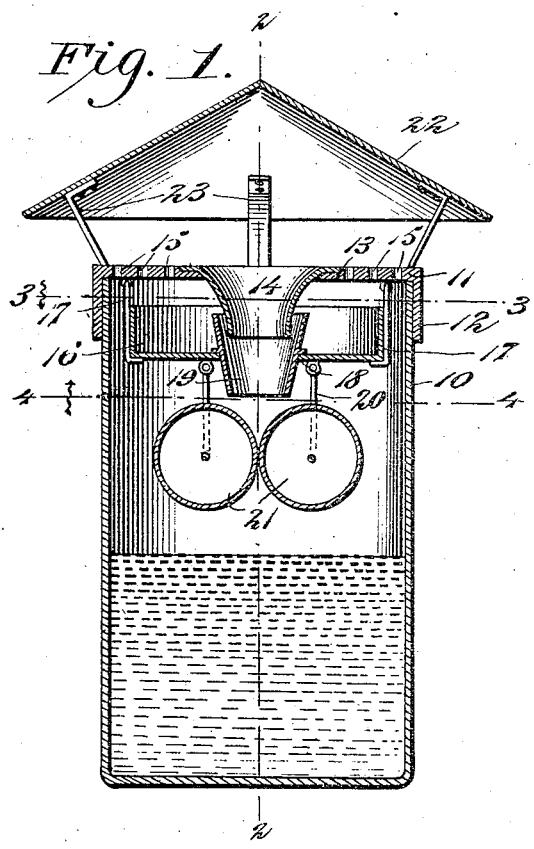
Figure 2:
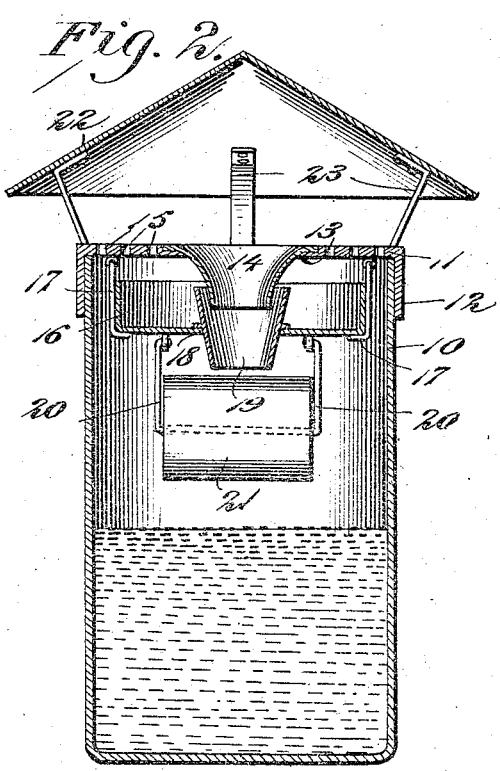
Figure 3:
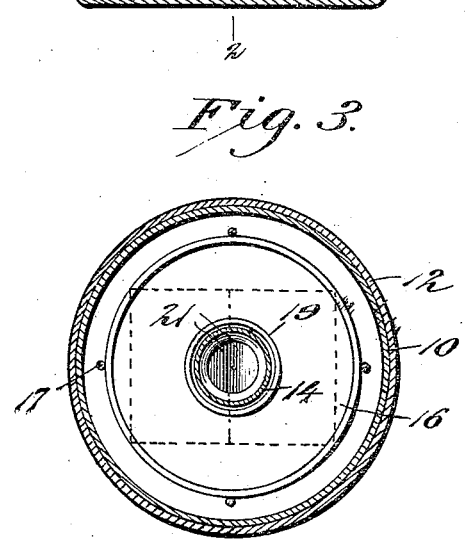
Figure 4:
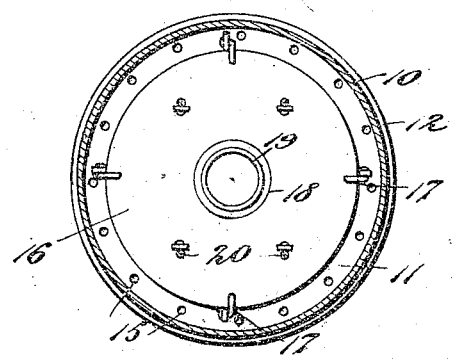

In the drawing, Figure 1 is a vertical sectional view showing a simple and preferred form of a trap constructed in accordance with the invention. Fig. 2 is a vertical transverse sectional view taken on the line 2—2 in Fig. 1. Fig. 3 is a horizontal sectional view taken on the line 3—3 in Fig. 1. Fig. 4 is a horizontal sectional view taken on the line 4—4 in Fig. 1.

Corresponding parts in the several figures are denoted by like characters of reference.

The main receptacle 10 may consist of a box or barrel or it may, when the trap is used in the open consist of an excavation in the ground which may be lined or protected in any desired manner. A lid 11 is provided, said lid having an annular depending flange 12 which may surround the receptacle 10. The lid has a central inlet aperture 13 equipped with a downwardly extending funnel 14. Said lid may also be provided with numerous small openings 15 for the purpose of diffusing the scent of the bait, as hereafter set forth. A bait pan or receptacle 16 is supported detachably on hooks 17 depending from the lid, and said bait pan is provided with a central opening 18 registering with the inlet 13 in the lid and a funnel 19 engaging the opening 18 has an upwardly extending portion which surrounds and receives the lower portion of the funnel 14 forming a wall or cut-off in the annular space between which and the outer wall of the pan or receptacle 16 the bait may be placed, thus rendering the bait inaccessible to the victims, while the scent or odor of the bait will be diffused not only through the apertures 13 of the lid, but also through the space between the funnels 19 and 14. The bait pan is supported in the manner described in order that it may be readily removed with the lid from the main receptacle 10, and afterward conveniently detached for cleansing and for the placing of bait therein. Swinging yokes 20 are supported beneath the bait pan on diametrically opposite sides of the funnel, said yokes carrying rollers 21 consisting preferably of bright metallic cylinders that revolve freely on their respective yokes and which, by gravity, are normally supported beneath the end of the funnel 19 that projects through the opening 18 in contact with each other, so that said funnel opening will in a measure be obstructed thereby.

The parts are so proportioned that when the yokes 20 hang in a vertical position to which they naturally gravitate, the cylinders 21 will barely contact with each other, as seen in Fig. 1. Thus, although the view of parts lying below the cylinders 21 is obstructed, the said cylinders will swing apart when subjected to the slightest possible pressure, leaving no possibility of forming any support for the victim, as would be the case if the cylinders were spring-actuated in the direction of each other.

When the trap is designed for out-door use, it may be protected by a hood or cover 22 having legs 23, whereby it may be supported on the lid 11 sufficiently elevated above the latter to create no suspicion in the animals that it is desired to catch.

In the operation of the trap, bait of any description is placed in the pan 16 where it is retained between the walls of the pan and the funnel 19. The bait pan is supported detachably on the hooks 17 in such a manner that the funnel 14 connected with the lid will project within the upper end of the funnel 19 of the bait pan. The odors of the bait will arise through the apertures 15 and will stimulate the appetite of the victims which attracted thereby will endeavor to obtain access to the bait through the funnel 14. The bright cylinders 21, when seen by the animals through the openings of the funnel, will arouse the curiosity of the victims and induce them to enter through the top funnel 14, the bottom funnel 19 being provided to prevent direct access to the bait. The animal alighting on the rollers 21 will cause the latter to swing aside, thereby precipitating the animal into the receptacle, escape from which will be rendered practically impossible by the rollers which by gravity will obstruct the only opening.

It is desired to be understood that no limitation is intended to be made with respect to the material employed in the manufacture of the trap, the shape or the dimensions of the latter or the precise construction of the parts of the device, except as implied in the appended claim.

Having thus described the invention, what is claimed as new, is:—

In a device of the class described, the combination with a receptacle, of a lid having an inlet provided with a downwardly extending funnel, a bait pan supported beneath the lid and having a funnel which surrounds the lower portion of the funnel depending from the lid and which coöperates with the outer wall of the bait pan to form a bait receiving annular space, yokes pivoted on the underside of the bait pan, and bright metallic cylinders journaled on the yokes, the parts being so proportioned that the cylinders will contact with each other when the yokes gravitate to an approximately vertical position.

In testimony whereof I affix my signature in presence of two witnesses.

CASPER YOST.

Witnesses:
  LEW. P. STONE,
  G. Y. FOSTER.